(12) United States Patent
Francis

(10) Patent No.: US 7,681,112 B1
(45) Date of Patent: Mar. 16, 2010

(54) EMBEDDED REUSE META INFORMATION

(75) Inventor: Andrew Francis, Montreal (CA)

(73) Assignee: Adobe Systems Incorporated, San Jose, CA (US)

( * ) Notice: Subject to any disclaimer, the term of this patent is extended or adjusted under 35 U.S.C. 154(b) by 1126 days.

(21) Appl. No.: 10/449,878

(22) Filed: May 30, 2003

(51) Int. Cl.
*G06F 17/00* (2006.01)

(52) U.S. Cl. .......... 715/201; 715/234; 715/243

(58) Field of Classification Search .......... 715/501, 715/501.1, 201, 234, 243
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,357,603 A | 10/1994 | Parker |
| 5,388,201 A | 2/1995 | Hourvitz et al. |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,022 A | 10/1996 | Brown |
| 5,588,098 A | 12/1996 | Chen et al. |
| 5,602,997 A | 2/1997 | Carpenter et al. |
| 5,638,501 A | 6/1997 | Gough et al. |
| 5,651,107 A | 7/1997 | Frank et al. |
| 5,731,819 A | 3/1998 | Gagne et al. |
| 5,742,285 A | 4/1998 | Ueda |
| 5,764,229 A | 6/1998 | Bennett |
| 5,764,238 A | 6/1998 | Lum et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |

(Continued)

FOREIGN PATENT DOCUMENTS

EP 548586 6/1993

(Continued)

OTHER PUBLICATIONS

Courter, et. al., Mastering Microsoft Office 2000 Professional Edition, SYBEX Inc., published 1999, pp. 165-170.*

(Continued)

*Primary Examiner*—Amelia Rutledge
(74) *Attorney, Agent, or Firm*—Fish & Richardson P.C.

(57) ABSTRACT

Systems and techniques to facilitate reuse of page components. In general, the techniques includes: generating multiple components of a markup language document to be rendered, the multiple components being derived from one or more information sources, designating the multiple components in the markup language document using a recognized identifier of document sections, and adding reuse information to the designated components of the markup language document so that the reuse information is readable with the components but not revealed when the markup language document is rendered, the reuse information specifying how the components may be repurposed via access to the one or more information sources. The techniques further include: rendering multiple components of a presentation, and in response to a selection of one or more components in the presentation, using reuse information contained in the one or more components to facilitate repurposing of the one or more components.

46 Claims, 4 Drawing Sheets

U.S. PATENT DOCUMENTS

| | | |
|---|---|---|
| 5,835,692 A | 11/1998 | Cragun et al. |
| 5,835,693 A | 11/1998 | Lynch et al. |
| 5,838,316 A | 11/1998 | Arruza |
| 5,877,741 A | 3/1999 | Chee et al. |
| 5,877,762 A | 3/1999 | Young |
| 5,883,639 A | 3/1999 | Walton et al. |
| 5,920,659 A | 7/1999 | Iverson et al. |
| 5,933,148 A | 8/1999 | Oka et al. |
| 5,949,409 A | 9/1999 | Tanaka et al. |
| 5,978,579 A | 11/1999 | Buxton et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,075,543 A | 6/2000 | Akeley |
| 6,128,010 A | 10/2000 | Baxter et al. |
| 6,144,381 A | 11/2000 | Lection et al. |
| 6,154,601 A | 11/2000 | Yaegashi et al. |
| 6,166,748 A | 12/2000 | Van Hook et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,278,448 B1 | 8/2001 | Brown et al. |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,321,314 B1 | 11/2001 | Van Dyke |
| 6,353,437 B1 | 3/2002 | Gagne |
| 6,356,903 B1 * | 3/2002 | Baxter et al. .................. 707/10 |
| 6,369,823 B2 | 4/2002 | Ohba |
| 6,369,830 B1 | 4/2002 | Brunner et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,489,963 B2 | 12/2002 | Parikh et al. |
| 6,512,522 B1 | 1/2003 | Miller et al. |
| 6,525,736 B1 | 2/2003 | Erikawa et al. |
| 6,526,174 B1 | 2/2003 | Graffagnino |
| 6,542,160 B1 | 4/2003 | Abgrall |
| 6,542,166 B1 | 4/2003 | Washington et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,687,745 B1 | 2/2004 | Franco et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,715,053 B1 | 3/2004 | Grigor |
| 6,717,599 B1 | 4/2004 | Olano |
| 6,734,864 B2 | 5/2004 | Abgrall |
| 6,765,592 B1 | 7/2004 | Pletcher et al. |
| 6,788,318 B2 | 9/2004 | Chen |
| 6,806,892 B1 | 10/2004 | Plow et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,931,633 B1 | 8/2005 | Vazquez et al. |
| 6,944,829 B2 | 9/2005 | Dando |
| 6,985,939 B2 * | 1/2006 | Fletcher et al. .............. 709/223 |
| 6,993,721 B2 | 1/2006 | Rosin et al. |
| 7,016,011 B2 | 3/2006 | De Haan |
| 7,027,055 B2 | 4/2006 | Anderson et al. |
| 7,050,955 B1 | 5/2006 | Carmel et al. |
| 2001/0030647 A1 | 10/2001 | Sowizral et al. |
| 2001/0035885 A1 | 11/2001 | Iron et al. |
| 2002/0065946 A1 | 5/2002 | Narayan |
| 2002/0067418 A1 | 6/2002 | I |
| 2002/0078453 A1 | 6/2002 | Kuo |
| 2002/0087660 A1 * | 7/2002 | Martin et al. ................ 709/218 |
| 2002/0089526 A1 | 7/2002 | Buxton et al. |
| 2002/0093516 A1 | 7/2002 | Brunner et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0129092 A1 | 9/2002 | Tolson et al. |
| 2002/0140740 A1 | 10/2002 | Chen |
| 2002/0171682 A1 | 11/2002 | Frank et al. |
| 2002/0174181 A1 | 11/2002 | Wei |
| 2002/0186257 A1 | 12/2002 | Cadiz et al. |
| 2003/0005412 A1 | 1/2003 | Eanes |
| 2003/0008711 A1 | 1/2003 | Corbo |
| 2003/0020671 A1 | 1/2003 | Santoro et al. |
| 2003/0046316 A1 | 3/2003 | Gergic et al. |
| 2003/0067489 A1 | 4/2003 | Wong et al. |
| 2003/0080995 A1 | 5/2003 | Tenenbaum et al. |
| 2003/0123739 A1 | 7/2003 | Graffagnino |
| 2003/0146934 A1 | 8/2003 | Bailey et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0189597 A1 | 10/2003 | Anderson et al. |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0179019 A1 | 9/2004 | Sabella et al. |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0144563 A1 | 6/2005 | Hough et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0193368 A1 | 9/2005 | Becker et al. |
| 2005/0215310 A1 | 9/2005 | Boyd et al. |
| 2005/0240857 A1 | 10/2005 | Benedict et al. |

| | | | |
|---|---|---|---|
| 2005/0256940 | A1 | 11/2005 | Henderson et al. |
| 2005/0278651 | A1 | 12/2005 | Coe et al. |
| 2005/0282612 | A1 | 12/2005 | Mathews |
| 2005/0283734 | A1 | 12/2005 | Santoro et al. |
| 2006/0064674 | A1 | 3/2006 | Olson et al. |
| 2006/0075106 | A1 | 4/2006 | Hochmuth et al. |
| 2006/0075141 | A1 | 4/2006 | Boxenhorn |
| 2006/0089840 | A1 | 4/2006 | May |
| 2006/0123356 | A1 | 6/2006 | Sobeski et al. |
| 2006/0218499 | A1 | 9/2006 | Matthews |
| 2007/0038934 | A1 | 2/2007 | Fellman |
| 2007/0044029 | A1 | 2/2007 | Fischer et al. |
| 2007/0044039 | A1 | 2/2007 | Amadio et al. |
| 2007/0061724 | A1 | 3/2007 | Slothouber et al. |
| 2007/0074157 | A1 | 3/2007 | Worden et al. |
| 2007/0101291 | A1 | 5/2007 | Forstall et al. |
| 2007/0203984 | A2 | 8/2007 | AlHusseini et al. |
| 2007/0209013 | A1 | 9/2007 | Ramsey et al. |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | WO98/45815 | 10/1998 |
| WO | WO02/09039 | 1/2002 |
| WO | WO2004/027707 | 4/2004 |

OTHER PUBLICATIONS

"XML in a Content Infrastructure: Conducting Business on the Web", copyright 2001, Interwoven, Inc., p. 1-21.*
Gaedke, et al., "WebComposition: An Object-Oriented Support System for the Web Engineering Lifecycle", Proceedings of WWW6, 1997, p. 1-11.*
XSL Transformations (XSLT) Version 1.0 W3C Recommendation Nov. 16, 1999, p. 1-90.*
Akeley, et al. "Real-Time Graphics Architecture," downloaded from the internet at http://www.graphics.stanford.edu/courses/cs448a-01-fall, 2001, 20 pages.
Altman, R.B., "Visual Quickstart Guide Power Point 2000/98" Peachpit Press, May 7, 1999, Retrieved from the Internet at http://www.proquest.safaribooksonline.com/0201354411, 7 pages.
Apple Computer, Inc. "Writing a Desk Accessory," Developer Connection, downloaded from the internet at URL: http://developer.apple.com/documentation/mac/devices/devices-16.html on Jan. 3, 2006, 3 pages.
Cadiz, et al., "Sideshow: Providing Peripheral Awareness of Important Information," Technical Report MSR-TR-2001-83, Sep. 14, 2001, downloaded from the internet at ftp://ftp.research.microsoft.com/pub/tr/tr-2001-83.pdf, 9 pages.
Carciofi, Authorized Officer, "International Search Report and Written Opinion", Patent Cooperation Treaty, PCT/US2009/033114, dated May 7, 2009, 14 pages.
Casteller, "International Search Report", European Patent Office, PCT/US2005/008805, Aug. 8, 2005, 3 pages.
Conner, et al. "Three-Dimensional Widgets" ACM Proceedings of the 1992 symposium on Interactive 3D graphics, Special Issue of Computer Graphics, vol. 26, 1992, pp. 183-188, 230-231 *8 pages).
Daniel et al., "Mashing Up Context-Aware Web Applications: A Component-Based Development Approach," Web Information Systems Engineering—Wise 2008; Lecture Notes in Computer Science, vol. 5175, 2008, pp. 250-263, XP019103131.
DelChiaro, "International Search Report", European Patent Office, PCT/US2005/008804, Jul. 27, 2005, 3 pages.
Desktop Sidebar, "Desktop Sidebar Home Page", downloaded from the internet at http://webarchive.org/web/20040101160831/http://www.desktopsidebar.com/, on May 11, 2007, 5 pages.
Donatien Grolaux et al. "Attach Me, Detach Me, Assemble Me Like you Work" Human-Computer Interaction—Interact 2005 Lecture Notes in Computer Science, Springer, Berlin, DE, vol. 3585, Jan. 1, 2005, pp. 198-212.
Elliott, "Programming Graphics Processors Functionally," Proceedings of the 2004 Haskell Workshop, Sep. 22, 2004. 11 pages.

Farrand, et al. "Common Elements in Today's Graphical User Interfaces: The Good, the Bad, and the Ugly," Proceedings of the Interchi '93, Human Factors in Computing Systems, 1993, pp. 470-473.
Fried, "Developer Calls Apple's Tiger a Copycat," CNET News.com, Jun. 28, 2004, downloaded from the internet at http://zdnet.com.com/2102-1104_2-5250692.html?tag=printthis on Jul. 1, 2004, 2 pages.
Fried, "For Apple's Tiger, the Keyword is Search", CNET News.com, Jun. 28, 2004, downloaded from the internet at http://zdnet.com.com/2102-1103_2-5250346.html?tag=printthis on Jul. 1, 2004, 2 pages.
Friedman, et al. "Dashboard Blog Dec. 4, 2003", downloaded from the internet at http://www.nat.org/dashboard/blog.php3, on May 11, 2007, 31 pages.
Grolaux et al., "Attach Me, Detach Me, Assemble Me Like You Work," Human-Computer Interaction—Interact 2005, Lecture Notes in Computer Science; LNCS Springer, Berlin DE 3585:198-212, XP019018979 (Jan. 1, 2005).
Gruber, "Dashboard vs. Konfabulator", Jun. 2004, downloaded from the internet at http://daringfireball.net/2004/06/dashboard_vs_konfabulator, on May 11, 2007, 9 pages.
Haeberli, et al., "The Accumulation Buffer: Hardware Support for High-Quality Rendering," Computer Graphics, vol. 24, No. 4, Aug. 1990, pp. 309-318.
Interwoven, Inc., "XML in a Content Infrastructure: Conducting Business on the Web, Domain Expertise Series", 2001, Interwoven, Inc., 21 pages.
Konfabulator, "Cupertino, Start your Photocopiers!," Retrieved from the internet at http://www.konfabulator.com, on Jul. 1, 2004, 1 page.
Konfabulator, "Konfabulator & Widget Basics," Retrieved from the Internet at http://www.konfabulator.com/info/basics.html, on Jul. 1, 2004, 3 pages.
Konfabulator, "Screenshots," Retrieved from the Internet at http://www.konfabulator.com/info/screenshots.html on Jul. 1, 2004, 2 pages.
Konfabulator, "What is Konfabulator?," Retrieved from the Internet at http://www.konfabulator.com/info/, on Jul. 1, 2004, 3 pages.
Lammers, et al., "Maya 4.5 Fundamentals: Chapter 13, Particle Systems and Dynamics", New Riders Publishing, 2002, 12 pages.
Puder, "Extending Desktop Applications to the Web," ACM International Conference Proceedings Series, Proceedings of the Jun. 2004 International Symposium on Information and Communication Technologies, 2004, vol. 90, pp. 8-13 (6 pages.).
Segal, et al. "The OpenGL Graphics System: A Specification (Version 1.5)," downloaded from the internet at http://www.opengl.org/documentation/specs/version1.5/glspec15.pdf, 2003, 333 pages.
Shantzis, Michael A., "A Model for Efficient and Flexible Image Computing," ACM Proceedings of the 21$^{st}$ annual conference on Computer graphics and interactive techniques, 1994, pp. 147-154.
Shiozawa, Hidekazu et al., "Perspective Layered Visualization of Collaborative Workspaces," Proceedings of the International ACM SIGGROUP conference on Supporting Group Work, 1999, pp. 71-75.
Snippet Software Inc. et al. "Corporate Portal Newsletter: Product Spotlight Non-Browser Based Portal Solution from Snippets Software, Inc.", vol. 1, No. 10, Oct. 2000 downloaded from the internet at http://web.archive.org/web/20010603050951/www.snippets.com/download/Corporate_Portal_Article.pdf, on Jul. 22, 2008, 3 pages.
Snippet Software Inc. et al. "Snippets Software" downloaded from the internet at http://www.snippets.com/, on Jun. 11, 2001, 16 pages.
Staples, "Representation in Virtual Space: Visual Convention in the Graphical User Interface", ACM Proceedings of the INTERACT '93 and CHI '93 Conference on Human Factors in Computing Systems, 1993, pp. 348-354 and 542 (8 pages).
Stardock Corporation "DesktopX Whitepaper and users Guide Version 2" downloaded from the internet at www.stardock.net/media/whitepaper_desktopx.html, on May 14, 2007, 72 pages.
Streitz et al., "i-Land: An Interactive Landscape for Creativity and Innovation," CHI 1999 Conference Proceedings Human Factors in Computing System. Pittsburg, PA (May 15-20, 1999), pp. 120-127, XP000894211.
Tang, et al., "ConNexus to Awarenex: Extending Awareness to Mobile Users," ACM Proceedings of the SIGCHI conference on Human factors in computing systems, 2001, pp. 221-228 (8 pages).

Tristram, "System and Method for Generating an Application Fragment", Pending U.S. Appl. No. 11/951,951, filed Dec. 6, 2007, 29 pages, to be published by USPTO.

Ullenboom, "Java ist auch eine Insel," downloaded from the internet at http://www.galileocomputing.de/openbook/javainsel2//java_140000.htm#Xxx998138, on Apr. 13, 2006, 3 pages.

Van Gelder, et al. "Direct Volume Rendering with Shading via Three-Dimensional Textures," ACM Proceedings of the 1996 symposium on Volume visualization, 1996, 9 pages.

W3C, "Objects, Images and Applets," Feb. 10, 2003, Retrieved from the Internet at http://www.web.archive.org/web/20030210154019/http://www.w3.org/TR/REC-html140/struct/objects.html, 21 pages.

Wardell, "Konfabulator for Windows", downloaded from the internet at URL: http://www.xpthemes.com/forums.asp?MID=19&CMID=19&AID=4472, on Jan. 10, 2004, 6 pages.

Webster, "Reusing Components in a Running Application", Pending U.S. Appl. No. 11/845,703, filed Aug. 27, 2007, 26 pages, to be published by USPTO.

Wikipedia, "Comparison of Widget Engines", downloaded from the internet at http://en.wikipedia.org/wiki/Comparison_of_widget_engines, on May 11, 2007, 6 pages.

Wikipedia, "Windows Sidebar", downloaded from the internet at http://en.wikipedia.org/wiki/Windows_Sidebar, on May 11, 2007, 2 pages.

Adobe, "A Manager's Introduction to Adobe eXtensible Metadata Platform, The Adobe XML Metadata Framework", 2002, 18 pages.

Adobe, "XMP—Extensible Metadata Platform, Version 1.5," Sep. 14, 2001, San Jose, CA, 88 pages.

Adobe, "Embedding XMP Metadata in Application Files (Draft)," Sep. 14, 2001, San Jose, CA, 16 pages.

Adobe, "Adobe GoLive, Version 6.0," 2002, San Jose, CA, 4 pages.

Adobe, "Extensible Metadata Platform (XMP)," web page from website: www.adobe.com/products/smp/main.html, 2pages, retrieved from Internet Apr. 12, 2003.

Microsoft Corporation, "Microsoft SharePoint Portal Server 2001; Architecting Web Parts for Business Applications—(prepared in conjunction with Avanade) White Paper," Jun. 2001, 11 pages.

IDEAlliance and PRISM Working Group, "PRISM: Publishing Requirements for Industry Standard Metadata, Version 1.2(e), First Public Draft," Sep. 4, 2002, 95 pages.

IDEAlliance, "Information and Content Exchange, An SML Based Distribution Protocol," 2002, 7 pages.

World Wide Web Consortium, "Resource Description Framework (RDF) Model and Syntax Specification," Feb. 22, 1999, 56 pages.

World Wide Web Consortium, "HTML 4.01 Specification," Dec. 24, 1999, 453 pages.

World Wide Web Consortium, "The Information and Content Exchange (ICE) Protocol," Oct. 26, 1998, 129 pages.

World Wide Web Consortium, "XHTML™ 1.0 The Extensible HyperText Markup Language (Second Edition), A Reformulation of HTML 4 in XML 1.0," Jan. 26, 2000; revised Aug. 1, 2002, 26 pages.

Gabe Beged-Dov, Dan Brickley, Rael Dornfest, Ian Davis, Leigh Dodds, Jonathan Eisenzopf, David Galbraith, R.V. Guha, Ken MacLeod, Eric Miller, Aaron Swartz and Eric van der Vlist, "RDF Site Summary (RSS) 1.0", retrieved from Internet on Feb. 5, 2003, URL: http://web.resource.org/rss/1/0/spec>, 23 pages.

* cited by examiner

EMBEDDED REUSE META INFORMATION

BACKGROUND OF THE INVENTION

The present application describes systems and techniques relating to reuse meta information in electronic documents, for example, meta information embedded in a Web page to indicate reusable components of the page.

Various advances in networking technology have created a revolution in communications and information exchange generally. This has been especially evident with the advent of the World Wide Web, where a client-server environment, Hypertext Markup Language (HTML) and Hypertext Transfer Protocol (HTTP) have expanded the possibilities for information systems and public dissemination of content. Web-based technologies are increasingly being adopted by organizations to communicate with their members and customers, and also to restructure and integrate their own information technology (IT) systems.

In general, a Web-based information system uses a client-server environment to disseminate information. A client-server environment is a network architecture in which clients generally rely on servers for resources. The resources provided by a server can be files, devices, database access, processing power, etc. Thus, a server resource is frequently referred to as a service (e.g., a Web service). Resources are typically provided in the form of an electronic document (e.g., a page) delivered to a requesting client. A received document is rendered by the client, such as by a Web browser rendering an HTML page, to present audio/visual content.

In addition, the document used to communicate information can be dynamic in one or both of two senses. First, an HTML document can be dynamically generated at a server using one or more information sources. A requested URL (Universal Resource Locator) can result in a different page being delivered to a client depending on information associated with the client, such as client location, time of day, pages previously viewed, and/or a client profile. Second, an HTML document can exhibit dynamic behavior after it is delivered to the requesting client. Extensions to HTML allow Web pages to react to user input without additional requests being sent back to the server.

Various tools have been developed that facilitate the use of Web-based technologies. For example, GoLive® software, provided by Adobe Systems Incorporated of San Jose, Calif., is a Web publishing tool that facilitates Web page authoring, website generation, and website management. Adobe® GoLive® software provides a graphical user interface used to create HTML documents, including dynamic HTML, that form a complete website. GoLive® software includes features to facilitate website design and management, including the ability to create HTML components of commonly used objects on a website: such HTML objects are designated in generated HTML files using the GoLive® <csobject> tag.

Moreover, various markup language specifications are being developed based on XML (eXtensible Markup Language) to facilitate the expansion of Web-based technologies. An HTML page is an example of a document designed to be rendered at a client. HTML generally describes how data should be displayed and mixes data semantics with data presentation information. XML describes information, generally addressing data semantics while ignoring issues of presentation and formatting, which are left to XHTML (eXtensible HTML) documents. XML documents are extensible: the underlying grammar is defined by the World Wide Web Consortium (W3C), but the tags may be defined by users of XML.

The various markup language specifications under development include RDF (Resource Description Framework), RSS (RDF Site Summary), PRISM (Publishing Requirements for Industry Standard Metadata), and ICE (Information Content Exchange). RDF is a language, including an XML-based version, for representing metadata about a resource (e.g., a website) to facilitate automated processing of metadata on the Web. RDF attempts to be domain neutral in order to support platform-independent exchange of machine-understandable information on the Web in multiple areas of endeavor, such as in resource discovery (e.g., to enhance search engine capabilities) and cataloging (e.g., describing content available at a Web site). For example, RDF can be used to provide metadata describing a website's sitemap, dates of updates, search-engine keywords, and intellectual property rights.

RSS is an RDF-based metadata format used to syndicate Web content. A website can enable others to republish some of the website's content by creating an RSS document. This RSS document can be a comprehensive catalog of syndication information for an entire website, and can be registered with an RSS publisher. If a client can read RSS-distributed content, the client can readily republish the syndicated content, such as news feeds, events listings, news stories, headlines, project updates, excerpts from discussion forums, or corporate information.

PRISM is an RDF-based metadata format used to describe content, interchange, and reuse. PRISM uses namespaces and controlled vocabularies to support syndicating, aggregating, and post-processing of content, including multi-purposing magazine, news, catalog, book, and mainstream journal content. PRISM provides a framework for the interchange and preservation of content and metadata, a collection of elements to describe that content, and a set of controlled vocabularies listing the values for those elements.

ICE is a protocol that manages and automates syndication relationships, data transfer, and results analysis. The ICE protocol can be used by content syndicators and their subscribers to manage syndication processes using an agreed upon content syndication vocabulary, such as that described in PRISM. The ICE protocol defines the roles and responsibilities of syndicators and subscribers, defines the format and method of content exchange, and provides support for management and control of syndication relationships.

SUMMARY OF THE INVENTION

The present disclosure includes systems and techniques relating to facilitating reuse of page components. According to an aspect, multiple components of a markup language document to be rendered can be generated, where the multiple components are derived from one or more information sources. The multiple components can be designated in the markup language document using a recognized identifier of document sections, and reuse information can be added to the designated components of the markup language document so that the reuse information is readable with the components but not revealed when the markup language document is rendered. The reuse information specifies how the components may be repurposed via access to the one or more information sources.

The reuse information can include terms of use information. The reuse information can be an identifier indicating a source of reuse information describing how the components are reusable via access to the one or more information sources. The reuse information can be syndication information.

The markup language document, including the reuse information, can be sent to a client in response to a request from the client. Generating the multiple components can involve generating the multiple components in response to the request from the client. The recognized identifier can be a div tag. The markup language document can be a hypertext markup language (HTML) page. The multiple components can be multiple visual components of the markup language document.

According to another aspect, multiple components of a presentation can be rendered, and reuse information contained in the one or more components can be used to facilitate repurposing of the one or more components, in response to a selection of one or more components in the presentation. A document that defines the presentation and includes the multiple components to be rendered can be obtained, and the multiple components can be derived from one or more information sources. The reuse information can be read when the multiple components are read for the rendering, and the reuse information can specify how the components may be repurposed via access to the one or more information sources.

The presentation can be an audio/video presentation. The selection can be a request to view reusable components in the presentation, and using the reuse information can involve displaying a list identifying a set of the components in the presentation that are reusable. The selection can be a direct selection of the one or more components in the presentation, such as a right click on a component in the presentation to open an options list that includes a component-specific option derived from the reuse information.

Using the reuse information can involve incorporating the selected one or more components into another resource based on the reuse information. Incorporating the selected one or more components can involve allowing modification of the selected one or more components during the incorporation, and allowing modification of the components can involve allowing modification in accordance with terms of use information included in the reuse information.

A system implementing the systems and techniques here can include a processor, a machine-readable medium coupled with the processor, and a Web publishing software product tangibly stored on the machine-readable medium. The Web publishing software product can include instructions operable to cause the processor to perform the operations: obtaining a reusable component of a Web presentation, and in response to a selection of the reusable component, using reuse information contained in the reusable component to facilitate repurposing of the reusable component. The operations can also include enforcing restrictions on modification to the reusable component indicated by the reuse information, supporting syndicated content purchase negotiations using the reuse information, and/or searching for component resources using the reuse information.

The invention can be implemented to realize one or more of the following advantages. Components of pages from a website can be readily designated, and reuse meta information can be embedded in those designated components to facilitate reuse of those components. A standardized control vocabulary for reuse can be embedded in the Web pages delivered to clients, and no separate catalog and protocol are required to specify reuse information. Content consumers can be made more aware of what parts of a Web page can be reused; reusable components and appropriate sources of syndicated content can be quickly identified from a delivered Web page itself. Content creators can more easily promote reuse of Web pages at a component level, and website syndication and website generation using syndicated components can be facilitated. Moreover, content creators can readily include reuse information with a component when that component is created and avoid creation of a separate reuse meta information document, as is typical with traditional reuse meta information that is separated from the source content, which can create significant difficulty in trying to identify and discover reuse information.

Reusable components of Web pages can be more easily identified. Reuse information for a reusable component can be accessed at the point of use for the component. Thus, a content consumer can see a reusable component in its original context when the reuse information is accessed. Access to this reuse information can be provided by software tools that read the Web pages (e.g., a Web publishing tool), and a standardized control vocabulary, such as that described in PRISM, and a syndication protocol, such as ICE, can be included, allowing reusable components to be found and mixed, and allowing a content consumer to negotiate different terms when incorporating a reusable component in their own work. The systems and techniques described can simplify Web content syndication processes, both in content generation and consumption, and can result in a much broader customer base for syndicated Web content, potentially increasing generation and availability of useful content on the Web.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files. Moreover, although this disclosure discusses the invention in the context of markup language documents, such as HTML documents, the invention is applicable to any final form content stream, which can be any document to be sent with the intention of being rendered at a client, or any content stream sent to be presented at a client, either visually, audibly, or otherwise. A final form content stream can be a document in a format where representation and semantics are intertwined.

Figure 1:
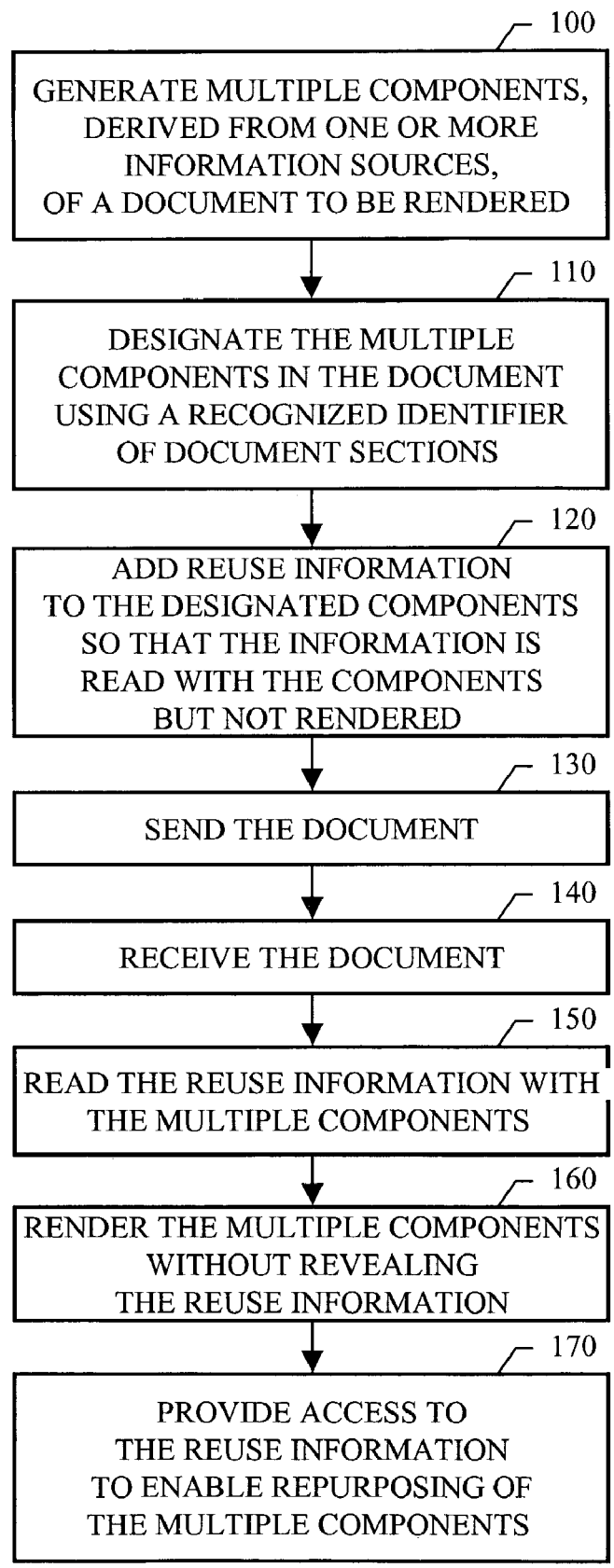
FIG. 1 is a flowchart illustrating document generation and use.

FIG. 1 is a flowchart illustrating document generation and use. Multiple components of a markup language document to be rendered are generated at 100. The multiple components are derived from one or more information sources, which can be local or remote sources. The document can be an HTML document. Generating the components can be part of a dynamic document generation process in response to a request for the document (e.g., generation of a Web page by a Web server), or part of website authoring process (e.g., generation of a Web page by a Web publishing tool, such as the Adobe® GoLive® software).

The multiple components in the markup language document are designated using a recognized identifier of document sections at 110. For example, in an HTML document, the <div> tag can be used to denote logical divisions in the HTML document. Thus, standard markup tags can be used to identify and separate distinct components of the markup language document. The recognized identifier becomes part of the designated component (e.g., the begin and end <div> tags and their content form a div element, which is the designated component, and the div element content holds the component information to be rendered).

Reuse information is added to the designated components of the markup language document at 120. This reuse information is embedded in the components themselves such that the reuse information is read with the components but not rendered when the markup language document is rendered. For example, the reuse information can be added to attributes of the div element and/or empty elements included within the div element. Thus, the component and its associated reuse information can be fused together to form a reusable component, which can be accessed, manipulated and stored as a unit.

The reuse information can specify how the components may be repurposed via access to the one or more information sources. The reuse information can include terms of use information. For example, the reuse information can include copyright information and payment information, including potentially different pricing schemes and payment terms. The reuse information can be an identifier indicating a source of reuse information describing how the components are dynamically created via access to the one or more information sources. For example, the reuse information can be a URI (Universal Resource Identifier) pointing to a catalog of reuse information. The reuse information can be syndication information. Such syndication information can include access metadata (e.g., a URL, push/pull information, available times, etc.), legal and business metadata (e.g., legal notices such as author and copyright information, and usage terms such as prices), and technical metadata about the component itself (e.g., application-specific component information and general component information such as creation date/time).

The components can be visual and/or audio components of the markup language document. The generated document, including the reuse information, can be sent to a requesting client at 130. The document can be received at the requesting client at 140. The received document is read at the client. The reuse information is read with the multiple components at 150. The multiple components are rendered without revealing the reuse information at 160. Rendering the components can involve generating an image on a display and/or generating sound output on a speaker.

During reading of the document, the reuse information is read along with the components, but the reuse information is not presented during the rendering of the components. For example, when the reuse information is included in attributes of a div element and empty elements included within the div element holding a component of an HTML page, this reuse information is automatically loaded into the DOM (Document Object Model) when the HTML page is read at the client but is not presented. The reuse information is thus readily accessibly in the DOM using standard DOM access functions, but does not affect rendering by traditional Web browsers that have no understanding of the reuse information included in the HTML page. Most traditional Web browsers effectively ignore the div element in visual rendering of a page.

Access to the reuse information is provided at 170. This access enables repurposing of the multiple components according to the reuse information, as described further below. This access can be provided by a number of different tools and in various processing environments. For example, a specific client-server communication is not required; a Web publishing tool can obtain the document initially by loading it from a storage medium and then provide the access to the multiple components to enable repurposing of those components.

Figure 2:
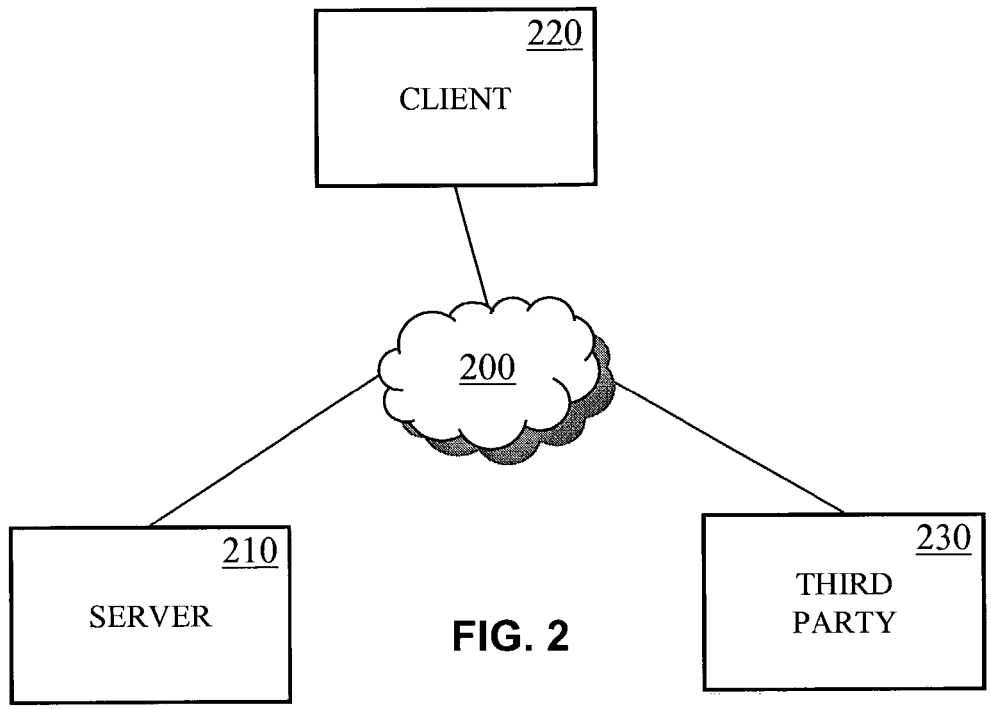
FIG. 2 is a block diagram illustrating an example client-server environment.

FIG. 2 is a block diagram illustrating an example client-server environment. A network 200 provides communication links between a server 210 and a client 220, and potentially a third party 230. The network 200 can be any communication network linking machines capable of communicating using one or more networking protocols, including a local area network (LAN), metropolitan area network (MAN), wide area network (WAN), enterprise network, virtual private network (VPN), the Internet, etc. The server 210 can be any machine or process, capable of communicating over the network 200, that has resources available to other machines coupled with the network 200. Likewise, the third party 230 can be any machine or process, capable of communicating over the network 200, that has a resource available to other machines coupled with the network 200. The client 220 can be any machine or process capable of communicating over the network 200 with the server 210 and the third party 230. For example, the server 210 can be a Web server, the client 220 can be a Web browser, and the third party 230 can be a process provided by an affiliate of the provider of the server 210. Alternatively, the client 220 and the server 210 can be machines in a peer-to-peer network that operate in a client-server manner for at least one transaction. The client 220 requests resources from the server 210, and the server 210 provides requested resources to the client 220, possibly using the third party 230 to obtain information during communication with the client 220 and/or as an intermediary between the server 210 and the client 220.

The server 210 and a third party 230 can be content providers that embed reuse information in the components of documents sent to the client 220. This embedding of reuse information in documents intended to be rendered elsewhere (e.g., HTML pages delivered in response to website requests) makes it easy for content creators to share parts of their electronic documents as desired, and makes it easy for individuals to reuse components of received documents. Such documents can be rendered at the client 220, or partially at the client 220 and partially at a third party 230 (e.g., an online render engine, such as the Adobe® Graphics Server 2.0 software provided by Adobe Systems Incorporated of San Jose, Calif.).

In the context of the Web, embedding fine-grained reuse information in a final form content stream as described here may provide additional advantages and efficiencies as the Web changes and is increasingly used by business enterprises. As there becomes a clear distinction between servers that generate content and the services that render the output (e.g., an online render engines or the SVG (Scalable Vector Graphics) plug-in to client software) embedding reuse information in final form content being routed to a client can result in additional advantages and efficiencies. Moreover, Web trends such as electronic syndication, portal aggregation and personalization can also benefit from the embedding of reuse information described.

Figure 3:
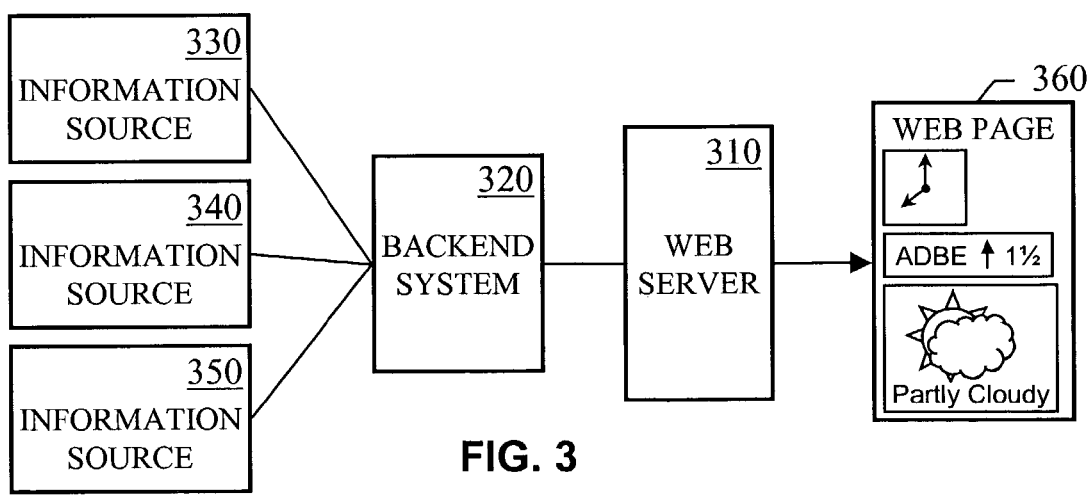
FIG. 3 is a block diagram illustrating exemplary Web page generation.

FIG. 3 is a block diagram illustrating exemplary Web page generation. A Web page 360 is generated by a Web server 310 using multiple information sources 330, 340, 350, which can be accessed through a backend system 320. The information sources 330, 340, 350 can be local sources or remote sources. In this example, the Web page 360 includes three components that come from three different information sources. The components are a clock, a stock quote for ADBE, and a weather forecast indicating today will be partly cloudy.

When the Web page 360 is generated, the Web server 310 uses standard markup tags to identify the components, and the Web server 310 embeds appropriate reuse metadata in the components of the page 360. Thereafter, a reusable component of the page 360 includes its own reuse metadata that enables reuse with the original source. The reusable component can be a standalone entity, which can be viewed in the source HTML, that simplifies access to and repurposing of the reusable component. The Web page 360 can act as an exemplar for how components are used. Moreover, the reuse information embedded in the components of the page 360 can introduce control vocabularies as a common way to identify and use metadata properties.

Figure 4:
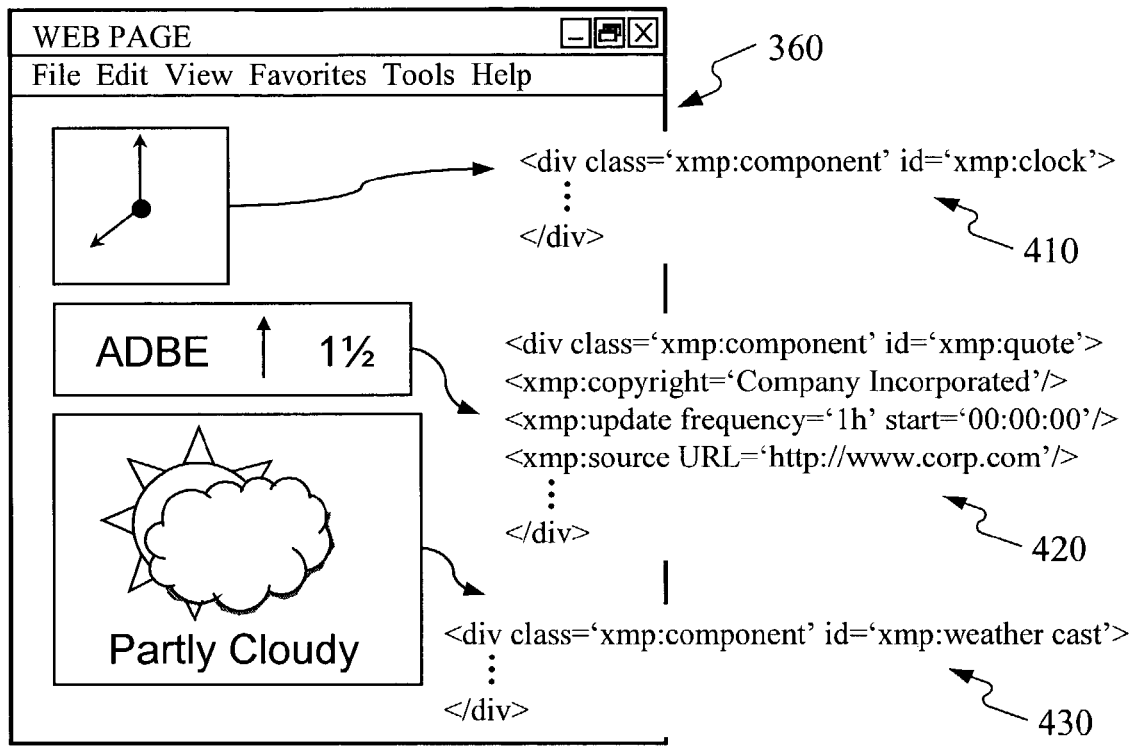
FIG. 4 is a block diagram illustrating the example Web page from FIG. 3 in a browser window and corresponding HTML.

FIG. 4 is a block diagram illustrating the example Web page 360 from FIG. 3 in a browser window and corresponding HTML. As shown, the reusable components of the page 360 can be designated by the div element. The class attribute of the div element can be used to identify that the content of the div element is a reusable component, and the id attribute can be used to identify the type of the reusable component. The clock component can be designated with HTML 410:

<div class='xmp:component' id='xmp:clock'>
    .
    .
    .
    </div>

The weather forecast component can be designated with HTML 430:

<div class='xmp:component' id='xmp:weather cast'>
    .
    .
    .
    </div>

Additional reuse information can be included in an attribute of the div element, such as in a single character string holding all the reuse information.

Alternatively, additional reuse information can be included in one or more child elements of the div element; provided the reuse information is not included as element content to be rendered. For example, the additional reuse information can be included in multiple empty elements as shown in this example of the stock quote component designated with HTML 420:

<div class='xmp:component' id='xmp:quote'>
    <xmp:copyright='Company Incorporated'/>
    <xmp:update frequency='1h' start='00:00:00'/>
    <xmp:source URL='http://www.corp.com'/>
    .
    .
    .
    </div>

Thus, the reuse information can be loaded into the DOM, in conjunction with the reading of a page component, without being rendered. Traditional Web browsers ignore the additional information when presenting the Web page, but the information is included in the DOM and can be programmatically accessed. If an individual sources the Web page, the reuse information can be easily seen. Moreover, a standardized control vocabulary can be used, such as that described in PRISM, and thus search engines can easily index such Web pages and their reusable components.

The reusable component and the meta information describing reuse are merged at the point of use, thus providing the component reuse information within a context indicating how that component can be used. This makes access to and reuse of a reusable component more intuitive, thus encouraging reuse. Web pages are frequently dynamic and use multiple information sources, and viewers of such Web pages may be interested in accessing one or more of those information sources to generate their own versions of interesting components found on Web pages. By presenting Web pages with defined reusable components that include their own reuse information, the abstract information of interest can be readily accessed from the context of an actual representation, and the component can be readily employed elsewhere with a different representation.

Figure 5:
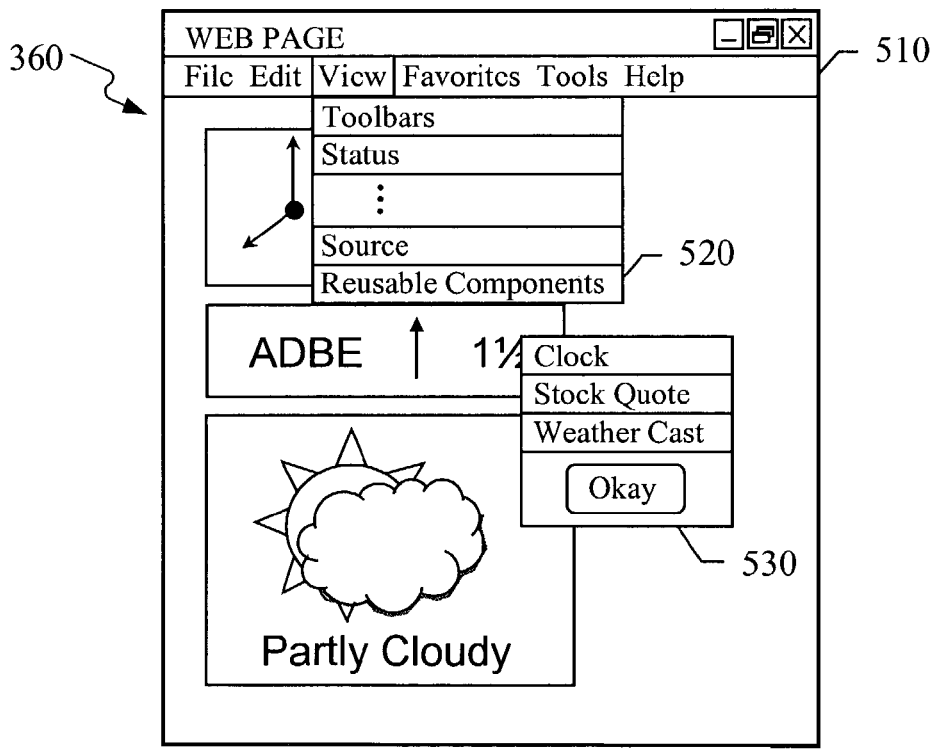
FIG. 5 is a block diagram illustrating the example Web page from FIG. 3 in a browser window and an example user interface.

FIG. 5 is a block diagram illustrating the example Web page 360 from FIG. 3 in a browser window and an example user interface. The Web browser can provide access to the reuse information in the page 360 to enable repurposing of the multiple components of the page. For example, in response to a received request, the browser can display a list identifying a set of the components that are reusable. The browser can include a menu bar 510 with a view menu option 520 that allows a user to view the reusable components on the page. Selection of the view menu option 520 can result in the Web browser accessing the reuse information in the DOM and generating a reusable components window 530. From this window 530, a user can quickly identify the reusable components on the page, can be provided with the ability to view source HTML for a reusable component, and can be provided with the ability to incorporate a reusable component into another document.

Providing such access can be performed by other software tools as well, either alone or in conjunction with each other. For example, a Web publishing tool can be used to load the page 360, and in response to a received request, the Web publishing tool can allow incorporation of the reusable components into a new document that uses the one or more information sources, which are indicated by the reuse information in the page 360, to dynamically define content for the components in the new document. The new document can be a new markup language document or other type of document. The Web publishing tool can also allow modification of the reusable components during incorporation into the new document. Using a standardized control vocabulary, interchangeable skins can be found for a reusable component and used to modify the component found. For example, a user can search a library of clock skins for the clock component and then combine a found clock skin with the original clock component (e.g., a discovered SVG clock skin component can be combined with a clock web service identified in the page 360).

Figure 6:
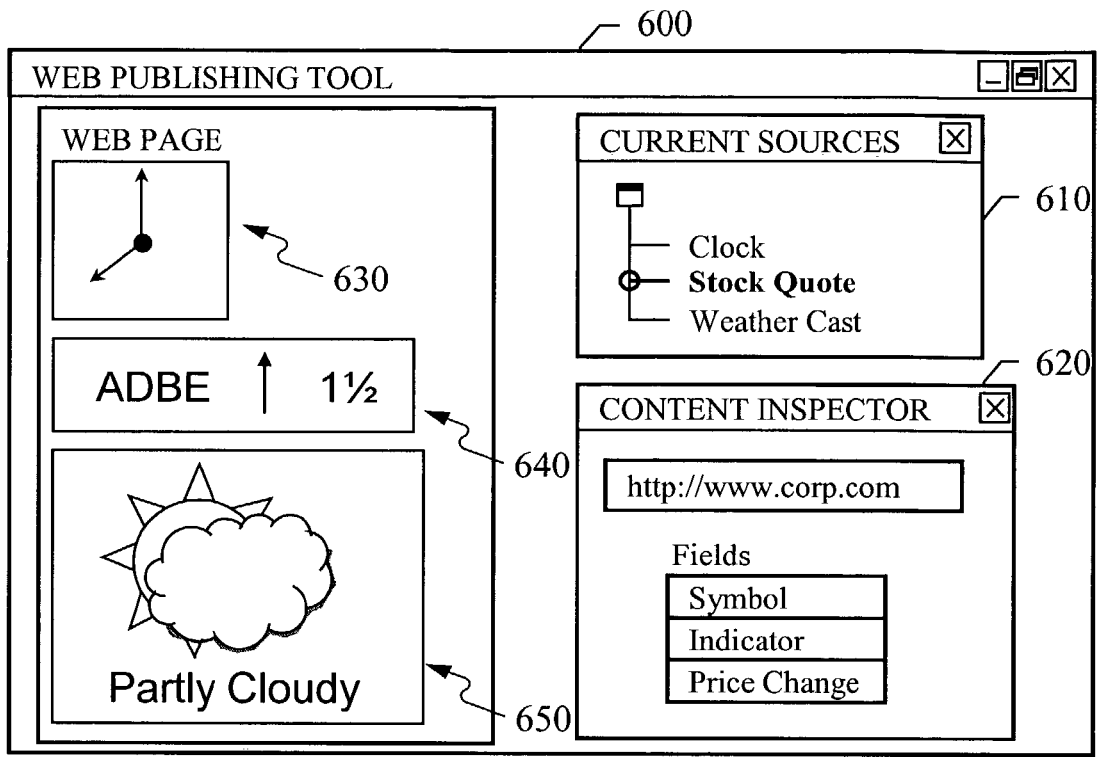
FIG. 6 is a block diagram illustrating the example Web page from FIG. 3 in an example Web publishing tool window.

FIG. 6 is a block diagram illustrating the example Web page from FIG. 3 in an example Web publishing tool window 600. A current sources window 610 shows the reusable components found on the loaded page: a clock component 630, a stock quote component 640, and a weather cast component

650. These reusable components can have associated reuse information as described above, including source information (e.g., a component can be identified as a Web service accessed via a CGI (Common Gateway Interface) script). The associated reuse information can be accessed using the Web publishing tool, such as using a content inspector window 620, which presents component information for selected stock quote component 640 (e.g., source information and fields information: symbol, indicator, price change).

The Web publishing tool can allow a user to modify the reusable components of the page, such as by incorporating the components in a new page. The Web publishing tool can enforce restrictions on modification indicated by the reuse information. Modification of a reusable component can be allowed only in accordance with terms of use information included in the reuse information. The Web publishing tool can include functionality to streamline the Web page generation process using reusable components. For example, the Web publishing tool can have built-in search capabilities (e.g., links to known search engines) and a user interface to simplify common changes to components (e.g., putting a new skin on a clock component); the Web publishing tool can have built-in syndication capabilities and a user interface to allow a user to negotiate a purchase of a reusable component directly from the Web publishing tool.

In addition to a standardized control vocabulary, such as that described in PRISM, a syndication protocol such as ICE can be used, and a user can negotiate different terms using the Web publishing tool when incorporating a reusable component in their own work. For example, the stock quote component 640 can have reuse information regarding source and update frequency, but also subscription information that specifies that the reusable component is free at one update frequency (e.g., once per day) and requires a subscription at another update frequency (e.g., a yearly subscription of $19.95 for updates every five minutes). Moreover, various digital rights management schemes can also be included to assist in enforcement of restrictions included in the reuse information.

Figure 7:
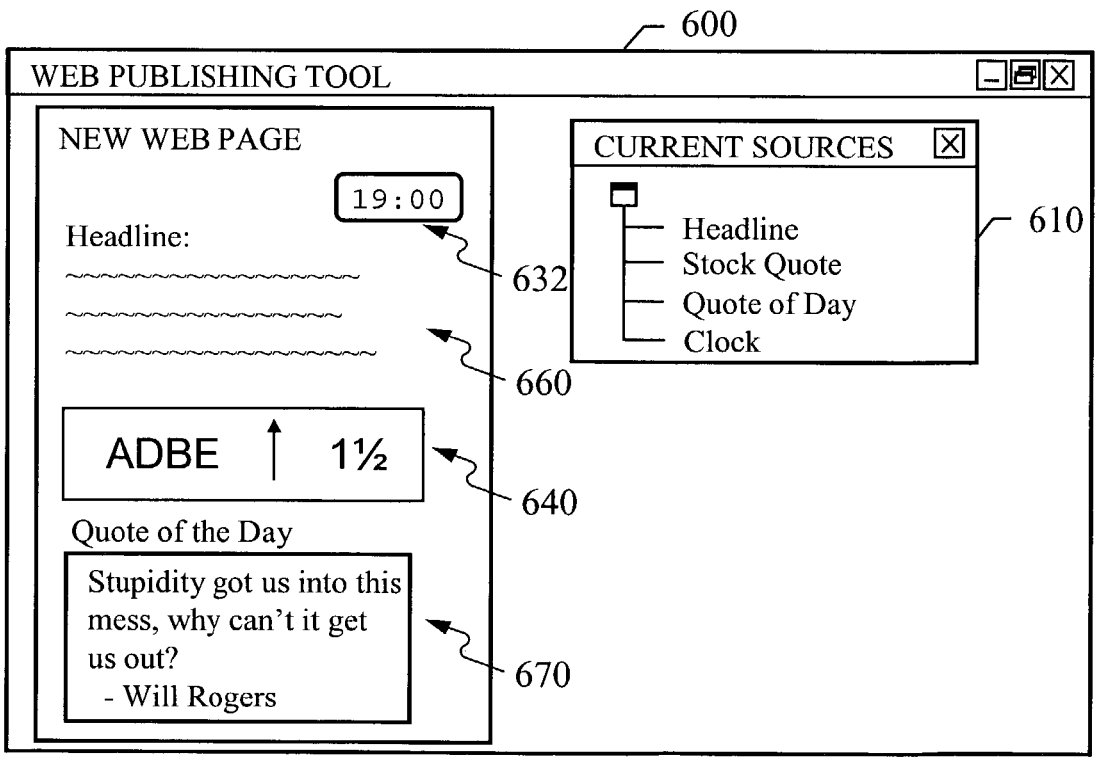
FIG. 7 is a block diagram illustrating a new Web page generated using reusable components in the example Web publishing tool illustrated in FIG. 6.

FIG. 7 is a block diagram illustrating a new Web page generated using reusable components in the example Web publishing tool illustrated in FIG. 6. The new page includes a headline component 660 from a news service and the stock component 640 for which a subscription has been negotiated and paid for through the Web publishing tool. The new page also includes a quote of day component 670 and a clock component 632, which is the clock component 630 with a new presentation format.

Many types of reusable components are possible, and these reusable components can have various dynamic sources. Using reuse information included with a component delivered in a final form content stream, such as a received HTML page, a software tool (or plug-in to an existing software tool) can allow a user to quickly and easily create new documents that mix and match various reusable components, including components that require payment for use, and modify the presentation of such components to serve their own interests and tastes. Moreover, when the Web publishing tool is used to create entirely original content, embedding reuse information as described above can facilitate syndication of the generated content. Thus, the systems and techniques described can simplify Web content syndication processes, both in content generation and consumption, and can result in a much broader customer base for syndicated Web content, potentially increasing generation and availability of useful content on the Web.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the invention can be implemented in a peer-to-peer or other network environment and is not limited to a client-server environment. The operations of the invention can be performed in a different order or in parallel and still achieve desirable results.

What is claimed is:

1. A computer implemented method comprising:
   generating multiple components of a web page to be rendered, the multiple components being derived from one or more information sources;
   designating the multiple components in the web page using a recognized identifier of document sections; and
   adding reuse information to the designated components in the web page so that the reuse information is readable with the components but not revealed when the web page is rendered, the reuse information specifying how the components may be repurposed.

2. The method of claim 1, further comprising sending the web page, including the reuse information, to a client in response to a request from the client, wherein said generating the multiple components comprises generating the multiple components in response to the request from the client, and the reuse information includes terms of use information.

3. The method of claim 1, wherein the reuse information identifies a source of further reuse information, the further reuse information describing how the components are reusable.

4. The method of claim 1, wherein the reuse information comprises syndication information, the syndication information comprising one or more of a link, push/pull information, or times of availability.

5. The method of claim 1, wherein the web page comprises a hypertext markup language page.

6. The method of claim 1, wherein the multiple components comprise one or more visual components and an audio component of the web page.

7. The method of claim 1, wherein the reuse information specifying how the components may be repurposed comprises terms of use.

8. The method of claim 1, wherein the reuse information specifying how the components may be repurposed comprises payment information.

9. The method of claim 1, wherein the reuse information specifying how the components may be repurposed comprises legal or business metadata, comprising one or more of author notices, copyright notices, or prices.

10. The method of claim 1, wherein the reuse information specifying how the components may be repurposed comprises technical metadata, comprising one or more of application-specific component information, creation date and time, or resource requirements.

11. The method of claim 1, wherein the reuse information specifying how the components may be repurposed comprises a link to a catalog of further reuse information, the further reuse information specifying how the components may be repurposed.

12. A computer implemented method comprising:
obtaining a web page that defines a presentation and includes multiple components to be rendered, the multiple components being derived from one or more information sources;
reading reuse information from the web page when the multiple components are read for the rendering, the reuse information specifying how the components may be repurposed;
rendering the multiple components of the presentation, the rendering not revealing the reuse information; and
in response to a selection of one or more of the multiple components in the presentation, using the reuse information contained in the one or more components to facilitate repurposing of the one or more components.

13. The method of claim 12, wherein the web page comprises a markup language document, and the multiple components are designated in the markup language document using a recognized identifier of document sections.

14. The method of claim 13, wherein the markup language document comprises a hypertext markup language page.

15. The method of claim 12, wherein the reuse information comprises syndication information, the syndication information comprising one or more of a link, push/pull information, or times of availability.

16. The method of claim 12, wherein the multiple components comprise one or more visual components and an audio component, and the presentation comprises an audio/video presentation.

17. The method of claim 12, wherein using the reuse information comprises incorporating the selected one or more components into a second document based on the reuse information.

18. The method of claim 17, wherein after the selected one or more components are modified.

19. The method of claim 18, wherein the modifying the components is done in accordance with terms of use information included in the reuse information.

20. The method of claim 12, wherein the reuse information specifying how the components may be repurposed comprises terms of use.

21. The method of claim 12, wherein the reuse information specifying how the components may be repurposed comprises payment information.

22. The method of claim 12, wherein the reuse information specifying how the components may be repurposed comprises legal or business metadata, comprising one or more of author notices, copyright notices, or prices.

23. The method of claim 12, wherein the reuse information specifying how the components may be repurposed comprises technical metadata, comprising one or more of application-specific component information, creation date and time, or resource requirements.

24. The method of claim 12, wherein the reuse information specifying how the components may be repurposed comprises a link to a catalog of further reuse information, the further reuse information specifying how the components may be repurposed.

25. A software product tangibly stored on a machine-readable medium, the software product comprising instructions operable to cause a programmable processor to perform operations comprising:
generating multiple components of a web page to be rendered, the multiple components being derived from one or more information sources;
designating the multiple components in the web page using a recognized identifier of document sections; and
adding reuse information to the designated components in the web page so that the reuse information is readable with the components but not revealed when the web page is rendered, the reuse information specifying how the components may be repurposed.

26. The software product of claim 25, wherein the operations further comprise sending the web page, including the reuse information, to a client in response to a request from the client, wherein said generating the multiple components comprises generating the multiple components in response to the request from the client, and the reuse information includes terms of use information.

27. The software product of claim 25, wherein the reuse information identifies a source of further reuse information, the further reuse information describing how the components are reusable.

28. The software product of claim 25, wherein the reuse information comprises syndication information, the syndication information comprising one or more of a link, push/pull information, or times of availability.

29. The method of claim 25, wherein the reuse information specifying how the components may be repurposed comprises one or more of:
terms of use;
payment information;
legal or business metadata, comprising one or more of author notices, copyright notices, or prices;

technical metadata, comprising one or more of application-specific component information, creation date and time, or resource requirements; or a link to a catalog of further reuse information, the further reuse information specifying how the components may be repurposed.

30. A software product tangibly stored on a machine-readable medium, the software product comprising instructions operable to cause a programmable processor to perform operations comprising:
obtaining a web page that defines a presentation and includes multiple components to be rendered, wherein the multiple components are derived from one or more information sources;
reading reuse information from the web page when the multiple components are read for the rendering, wherein the reuse information specifies how the components may be repurposed;
rendering the multiple components of the presentation, the rendering not revealing the reuse information; and
in response to a selection of one or more components in the presentation, using reuse information contained in the one or more components to facilitate repurposing of the one or more components.

31. The software product of claim 30, wherein the web page comprises a markup language document, and the multiple components are designated in the markup language document using a recognized identifier of document sections.

32. The software product of claim 31, wherein the markup language document comprises a hypertext markup language page.

33. The software product of claim 30, wherein the reuse information identifies a source of further reuse information, the further reuse information describing how the one or more components are reusable.

34. The software product of claim 30, wherein the reuse information comprises syndication information, the syndication information comprising one or more of a link, push/pull information, or times of availability.

35. The software product of claim 30, wherein the multiple components comprise multiple visual components, and the presentation comprises an audio/video presentation.

36. The software product of claim 30, wherein using the reuse information comprises incorporating the selected one or more components into a second document based on the reuse information.

37. The software product of claim 36, wherein after the selected one or more components are incorporated into the second document, the selected one or more components are modified.

38. The software product of claim 37, wherein said allowing modification of the components comprises allowing modification in accordance with terms of use information included in the reuse information.

39. The method of claim 30, wherein the reuse information specifying how the components may be repurposed comprises one or more of:
terms of use;
payment information;
legal or business metadata, comprising one or more of author notices, copyright notices, or prices;
technical metadata, comprising one or more of application-specific component information, creation date and time, or resource requirements; or
a link to a catalog of further reuse information, the further reuse information specifying how the components may be repurposed.

40. A software product tangibly stored on a machine-readable medium, the software product comprising:
an electronic document in a markup language format including multiple components to be rendered;
the multiple components being designated in the web page using a recognized identifier of document sections; and
the multiple components including reuse information specifying how the components may be repurposed,
wherein the reuse information is read with the multiple components but not revealed when the web page is rendered.

41. The software product of claim 40, wherein the multiple components comprise empty limitations with attributes containing at least a portion of the reuse information.

42. The method of claim 40, wherein the reuse information specifying how the components may be repurposed comprises one or more of:
terms of use;
payment information;
legal or business metadata, comprising one or more of author notices, copyright notices, or prices;
technical metadata, comprising one or more of application-specific component information, creation date and time, or resource requirements; or
a link to a catalog of further reuse information, the further reuse information specifying how the components may be repurposed.

43. A system comprising:
a processor;
a machine-readable medium coupled with the processor; and
a Web publishing software product tangibly stored on the machine-readable medium, the Web publishing software product comprising instructions operable to cause the processor to perform operations comprising:
receiving a Web page;
identifying a reusable component of the Web page, the reusable component being designated within the Web page, the reusable component containing reuse information, where the reuse information is not rendered when the Web page is rendered; and
in response to a selection of the reusable component, using the reuse information contained in the reusable component to facilitate repurposing of the reusable component.

44. The system of claim 43, wherein the operations further comprise enforcing restrictions on modification to the reusable component indicated by the reuse information.

45. The system of claim 43, wherein the operations further comprise supporting syndicated content purchase negotiations using the reuse information.

46. The system of claim 43, wherein the operations further comprise searching for component resources based on the reuse information.

* * * * *

UNITED STATES PATENT AND TRADEMARK OFFICE
CERTIFICATE OF CORRECTION

| | |
|---|---|
| PATENT NO. | : 7,681,112 B1 |
| APPLICATION NO. | : 10/449878 |
| DATED | : March 16, 2010 |
| INVENTOR(S) | : Andrew Francis |

Page 1 of 1

It is certified that error appears in the above-identified patent and that said Letters Patent is hereby corrected as shown below:

Column 12, line 6 (Claim 18), after "are" please insert --incorporated into the second document, the selected one or more components are--;

Column 14, line 19 (Claim 41), please delete "limitations" and insert --elements-- therefor.

Signed and Sealed this

Twenty-fourth Day of August, 2010

David J. Kappos
*Director of the United States Patent and Trademark Office*